Feb. 22, 1955 C. H. BISSELL 2,702,849
EXPLOSION RESISTING LIGHTING UNIT
Filed Aug. 23, 1949
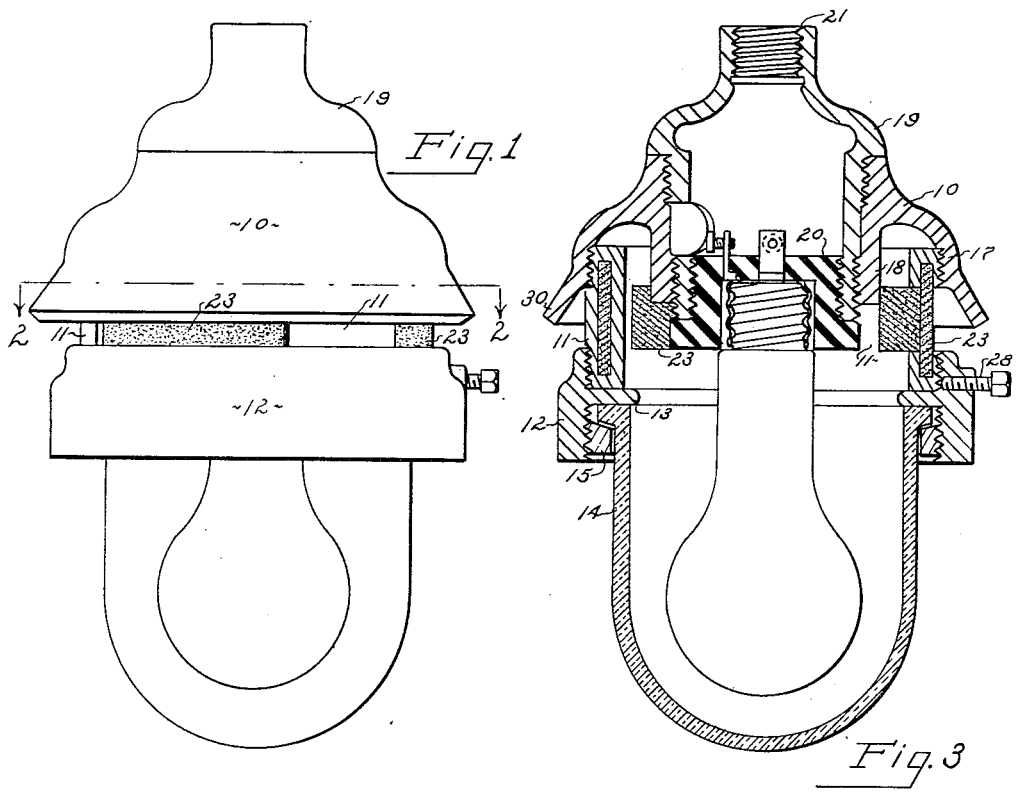
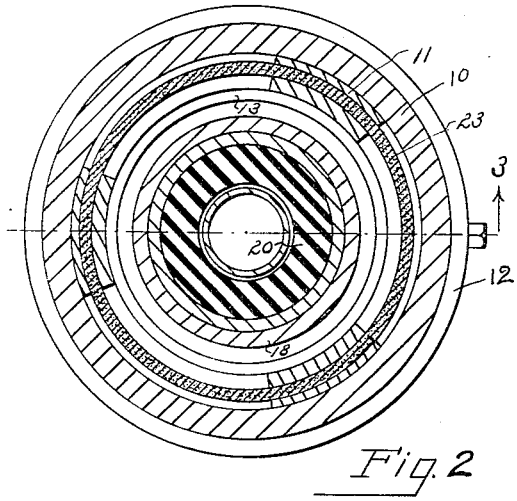
INVENTOR.
CARL H. BISSELL
BY Bodell + Thompson
Attorneys,

United States Patent Office 2,702,849
Patented Feb. 22, 1955

2,702,849

EXPLOSION RESISTING LIGHTING UNIT

Carl H. Bissell, Syracuse, N. Y., assignor to Crouse-Hinds Company, Syracuse, N. Y., a corporation of New York Application August 23, 1949, Serial No. 111,797

5 Claims. (Cl. 240—11.2)

This invention relates to explosion resisting lighting units, and more particularly of the type provided with a flame proof venting structure to relieve internal pressure in the event an explosive mixture within the unit is ignited.

The invention has as an object a lighting unit of the type referred to embodying a structure economical to manufacture and assemble and in which there is incorporated a relatively large venting area, the arrangement permitting access to the interior of the unit for relamping without disturbing the venting structure.

The invention consists in the novel features and in the combinations and constructions hereinafter set forth and claimed.

In describing this invention, reference is had to the accompanying drawings in which like characters designate corresponding parts in all the views.

In the drawings—

Figure 1 is a side elevational view of a lighting unit embodying my invention.

Figure 2 is a horizontal sectional view taken on line 2—2, Figure 1.

Figure 3 is a vertical sectional view taken on a line corresponding to line 3—3, Figure 2.

The lighting unit consists of a body 10 formed of cast metal and of substantially annular formation and having a depending annular flange 11, the lower portion of which is threaded externally to receive a second annular body portion 12 in the form of a globe supporting ring. The member 12 is threaded internally to permit it to be detachably secured to the flange 11 and, as shown in Figure 3, is formed with a flange 13 extending radially inwardly and against which a glass globe 14 abuts and which is held in flame tight relation to the ring 12 by a ring nut 15 threaded into the member 12.

In the structure shown, the flange 11 is also detachably secured to the body 10 as by being threaded into a flange 17 spaced outwardly from and concentrically with a flange 18. With this arrangement, the flange 11 serves as an annular connecting member for the body portions 10, 12, and may be conveniently removed from the unit for cleaning, or replacement. The upper end of the body 10 and the flange portion 18 are threaded internally to receive a cap portion 19 and a lamp receptacle 20 respectively. The receptacle 20, being threaded into the body, forms a flame tight barrier between the upper and lower portions of the unit, the lower portion being encircled by the flange 11 and the globe 14. The cap member 19 is threaded internally, as at 21, for attachment to a conduit line.

The flange 11 is formed with one or more openings which are closed by arcuate shaped venting members 23 formed of porous sintered metal. As shown in Figure 2, the venting member is in the form of a ring about which the flange 11 is cast or otherwise formed, whereby the ring, or the arcuate portions thereof, are permanently bonded in the flange. Preferably, the flange 11 is formed with a plurality of openings of susbtantial dimension, whereby a relatively large area of porous sintered material is made available and which functions to quickly vent the interior of the unit and thereby prevent the building up of any pressure within the unit.

The unit is relamped by loosening the set screw 28 and unscrewing the globe unit, including the annular member 12, from the flange 11, this without disturbing the flame tight joint between the glass globe 14 and the ring 12, and without disturbing the bond between the sintered material 23 and the flange 11.

The body 10 is formed with a conical flange 30 encircling the flange 11 and forming a protective canopy over the vents 23 to minimize the accumulation of dust, or other foreign material, that might have a tendency to plug up, or close, the interstices in the material.

What I claim is:

1. An explosion resisting lighting unit comprising a body member having an annular depending portion, a globe supporting ring detachably secured to said annular portion and a globe mounted in flame tight relation with said ring, said annular portion being formed with an opening, a venting member formed of porous sintered material closing said opening and being attached in flame tight relation to said annular portion, said body member being provided with a radially extending flange encircling said depending portion, a lamp receptacle mounted in the body member and forming, in conjunction with said annular depending portion and the globe, a flame tight compartment.

2. An explosion resisting lighting unit comprising a rigid body member having an annular depending portion, a globe unit detachably secured to said annular portion, said annular portion being formed with an opening, a venting member formed of porous sintered material closing said opening and being attached to said portion in flame tight relation, a conical shield carried by the body and extending circumferentially of said annular portion and being spaced outwardly therefrom, a lamp receptacle mounted in the body and forming, in conjunction with said globe unit and annular portion, a flame proof compartment.

3. An explosion proof lighting unit comprising a body member having concentrically arranged internally threaded depending flanges, a second body member having an internally threaded flange, an externally threaded annular connecting member threaded into the flange of said second body member and the outer flange of said first body member and encircling the inner flange thereof, said connecting member comprising a band of porous sintered metal having reinforcing rings bonded to the opposite ends thereof, said rings having axially extending reinforcing connecting members, a cap member threaded into said inner flange, a lamp receptacle threaded into said cap member, and a globe carried by said second body member.

4. An explosion proof lighting unit comprising a body member formed with a pair of inner and outer depending annular flanges arranged in spaced concentric relation and being threaded on their inner surfaces, an externally threaded annular member threaded into said outer flange and encircling said inner flange in spaced relation thereto, a globe detachably connected to said annular member in flame tight relation thereto, said annular member being formed with an opening, an arcuate shaped venting member formed of porous sintered metal closing said opening and being bonded to said annular member, a cap member threaded into said inner flange, a lamp receptacle threaded into said cap member and forming, in conjunction with said globe and annular member, a flame proof compartment.

5. An explosion resisting lighting unit comprising a body member formed with depending inner and outer flanges arranged concentrically and being threaded on their inner surfaces, an annular supporting member threaded into said outer flange and depending therefrom, said supporting member encircling said inner flange in spaced relation thereto, a globe unit threaded on the depending portion of said supporting member, said body being formed with an external conical flange encircling said supporting member, and said member being formed with an opening, a venting member formed of porous sintered metal forming a closure for said opening and being bonded to said supporting member, a cap member threaded into said inner flange, and a lamp receptacle threaded into said cap member and forming, in conjunction with said supporting member and globe unit, a flame proof compartment.

References Cited in the file of this patent

UNITED STATES PATENTS

| | | |
|---|---|---|
| 489,150 | Keil | Jan. 3, 1893 |
| 2,050,839 | Hastings | Aug. 11, 1936 |
| 2,530,135 | Tornblom | Nov. 14, 1950 |

FOREIGN PATENTS

| | | |
|---|---|---|
| 640,249 | France | Mar. 24, 1928 |
| 444,877 | Great Britain | Mar. 31, 1936 |
| 365,648 | Italy | Dec. 9, 1938 |